United States Patent
Wu

(10) Patent No.: US 10,944,934 B2
(45) Date of Patent: Mar. 9, 2021

(54) METHOD AND APPARATUS FOR CHANNEL SWITCHING IN INTERACTIVE SMARTBOARD

(71) Applicants: Guangzhou Shiyuan Electronics Co., Ltd., Guangzhou (CN); Guangzhou Shirui Electronics Co. Ltd., Guangzhou (CN)

(72) Inventor: Changjun Wu, Guangzhou (CN)

(73) Assignees: Guangzhou Shiyuan Electronics Co., Ltd., Guangzhou (CN); Guangzhou Shirui Electronics Co. Ltd., Guangzhou (CN)

( * ) Notice: Subject to any disclaimer, the term of this patent is extended or adjusted under 35 U.S.C. 154(b) by 0 days.

(21) Appl. No.: 16/319,989

(22) PCT Filed: Sep. 27, 2017

(86) PCT No.: PCT/CN2017/103589
§ 371 (c)(1),
(2) Date: Jan. 23, 2019

(87) PCT Pub. No.: WO2018/090735
PCT Pub. Date: May 24, 2018

(65) Prior Publication Data
US 2019/0268562 A1    Aug. 29, 2019

(30) Foreign Application Priority Data
Nov. 17, 2016    (CN) .......................... 201611030860.5

(51) Int. Cl.
*H04N 5/50* (2006.01)
*G06F 3/0488* (2013.01)
(Continued)

(52) U.S. Cl.
CPC ............. *H04N 5/50* (2013.01); *G06F 3/0488* (2013.01); *G09G 5/00* (2013.01); *G09G 5/006* (2013.01);
(Continued)

(58) Field of Classification Search
CPC .. H04N 5/50; H04N 21/4438; H04N 21/4113; H04N 21/4126; H04N 21/472;
(Continued)

(56) References Cited

U.S. PATENT DOCUMENTS

| 2010/0263016 A1 | 10/2010 | Itoga |
| 2012/0324077 A1 | 12/2012 | Roy |
| 2015/0365499 A1* | 12/2015 | Bereski ................... H04L 69/16 709/203 |

FOREIGN PATENT DOCUMENTS

| CN | 103116386 A | 5/2013 |
| CN | 103150209 A | 6/2013 |

(Continued)

OTHER PUBLICATIONS

International Search Report for PCT/CN2017/103589, dated Jan. 4, 2018, 6 pages.
(Continued)

*Primary Examiner* — Mark W Regn
(74) *Attorney, Agent, or Firm* — Zhong Law, LLC

(57) ABSTRACT

A method and an apparatus for channel switching in an interactive smartboard including receiving a channel switching request to switch from a first channel to a second channel; detecting a state of a system associated with the second channel; and when the state of the system associated with the second channel is a sleep state or a dormant state, according to the channel switching request, switching a touch receiving service to the system associated with the second channel and switching a current display from the first
(Continued)

channel to the second channel, and waking up the system associated with the second channel.

12 Claims, 3 Drawing Sheets

(51) Int. Cl.
| | |
|---|---|
| *H04L 12/12* | (2006.01) |
| *G09G 5/36* | (2006.01) |
| *G09G 5/00* | (2006.01) |
| *H04N 21/41* | (2011.01) |
| *H04N 21/443* | (2011.01) |

(52) U.S. Cl.
CPC ............... *G09G 5/36* (2013.01); *H04L 12/12* (2013.01); *H04N 21/4113* (2013.01); *H04N 21/4126* (2013.01); *H04N 21/4438* (2013.01); *G09G 2330/022* (2013.01); *G09G 2354/00* (2013.01); *G09G 2360/10* (2013.01)

(58) Field of Classification Search
CPC ............ G09G 5/00; G09G 5/006; G09G 5/36; G09G 2330/022; G09G 2360/10; G09G 2354/00; H04L 12/12; G06F 3/0488
See application file for complete search history.

(56) References Cited

FOREIGN PATENT DOCUMENTS

| CN | 103150210 A | * | 6/2013 |
|---|---|---|---|
| CN | 103150210 A | | 6/2013 |
| CN | 103902328 A | | 7/2014 |
| CN | 104360900 A | | 2/2015 |
| CN | 106792012 A | | 5/2017 |

OTHER PUBLICATIONS

First Office Action for Chinese Application No. 201611030860.5, undated, 11 pages.
Second Office Action for Chinese Application No. 201611030860.5, undated, 13 pages.
First Search Report for Chinese Application No. 201611030860.5, undated, 2 pages.
Supplemental Search Report for Chinese Application No. 201611030860.5, undated, 2 pages.
Nordman, "California Energy Commission Award No. 50-10-052 National Lab Buildings Energy Efficiency Research Projects LBNL EF87EE Task 2.11: Improved Audio-Video Efficiency Through Inter-Device Control Deliverable: Summary of Analysis of Communication Link Technologies", Sep. 21, 2012, pp. 1-17.
Extended European Search Report for 17871821.9, dated Jul. 22, 2019, 7 pages.

* cited by examiner

METHOD AND APPARATUS FOR CHANNEL SWITCHING IN INTERACTIVE SMARTBOARD

CROSS-REFERENCE TO RELATED APPLICATIONS

This application is a continuation of International Application No. PCT/CN2017/103589, filed on Sep. 27, 2017, which claims priority to Chinese Patent Application No. 201611030860.5, filed on Nov. 17, 2016, both of which are hereby incorporated by reference in their entireties.

TECHNICAL FIELD

The invention relates to the field of smart technology and, in particular, to a method and an apparatus for channel switching in an interactive smartboard.

BACKGROUND

With the development of smart technology, many smart products have been widely used in people's lives, including a dual-system interactive smartboard that generally includes two different operating systems, such as the Android system and the Windows system. The interactive smartboard can be an all-in-one machine that implements human-computer interactions using touch technology to operate on the content displayed on the smartboard, which not only has functionalities of high-definition display as a traditional LCD TV, but also has computer functionalities through a built-in personal computer (PC) module (i.e., a PC end), further implementing functions such as channel switching using the touch technology by performing touch operations on the interactive smartboard and thereby realizing human-computer interactions.

When the interactive smartboard is installed and operated with the Android (Android) system, the corresponding channel is a TV channel, and a TV signal is transmitted through the TV channel and displayed for a user to watch. When the interactive smartboard is switched to the TV channel, the PC module corresponding to the PC channel may be set to enter a sleep mode to save energy. When the user needs to switch from the Android system to the Windows system or to the Linux system running on the built-in PC end to continue using the PC, a current display channel signal needs to be switched to the built-in PC end. That is, the interactive smartboard needs to be switched from the TV channel to the PC channel. However, at this time, the PC module is still in the sleep state. In order that the interactive smartboard can operate normally after being switched to the PC channel, during the switching of the channels and after the switching of the touch and the display, an USB device or a key operation is needed to wake up the PC, thus resulting in inefficiency of the entire channel switching process.

SUMMARY

Based on this, it is necessary to provide a method and apparatus to improve the efficiency of channel switching in an interactive smartboard for the problem of inefficiency in the channel switching.

A method for channel switching in an interactive smartboard, including the following steps:
receiving a channel switching request to switch from a first channel to a second channel;
detecting a state of a system associated with the second channel; and
when the state of the system associated with the second channel is a sleep state or a dormant state, according to the channel switching request, switching a touch receiving service to the system associated with the second channel and switching a current display from the first channel to the second channel, and waking up the system associated with the second channel.

The present invention also provides an apparatus for channel switching in an interactive smartboard, including:
a switching request receiving module, configured to receive a channel switching request to switch from a first channel to a second channel;
a state detecting module, configured to detect a state of a system associated with the second channel; and
a switching module, configured to when the state of the system associated with the second channel is a sleep state or a dormant state, according to the channel switching request, switch a touch receiving service to the system associated with the second channel and switch a current display from the first channel to the second channel, and wake up the system associated with the second channel.

Regarding above mentioned method and apparatus for channel switching in an interactive smartboard, the above mentioned method for channel switching in the interactive smartboard includes, receiving a channel switching request to switch from a first channel to a second channel, detecting a state of a system associated with the second channel; and when the state of the system associated with the second channel is a sleep state or a dormant state, according to the channel switching request, switching a touch receiving service to the system associated with the second channel and switching a current display from the first channel to the second channel, and waking up the system associated with the second channel. Through the above mentioned method and apparatus for channel switching in the interactive smartboard, after acquiring the channel switch request, the channel switching is performed, that is, the touch receiving service switching is switched to the system associated with the second channel and the current display is switched from the first channel to the second channel, and the system associated with the second channel in the sleep state or the dormant state is waked up, so that the interactive smartboard can operate normally while the channel is switched to the second channel, without waking up the system associated with the second channel through a user's operation after the channel switching, thereby simplifying the operation process and accelerating the switching process, and as a result, improving the efficiency of the channel switching.

DESCRIPTION OF EMBODIMENTS

Figure 1:
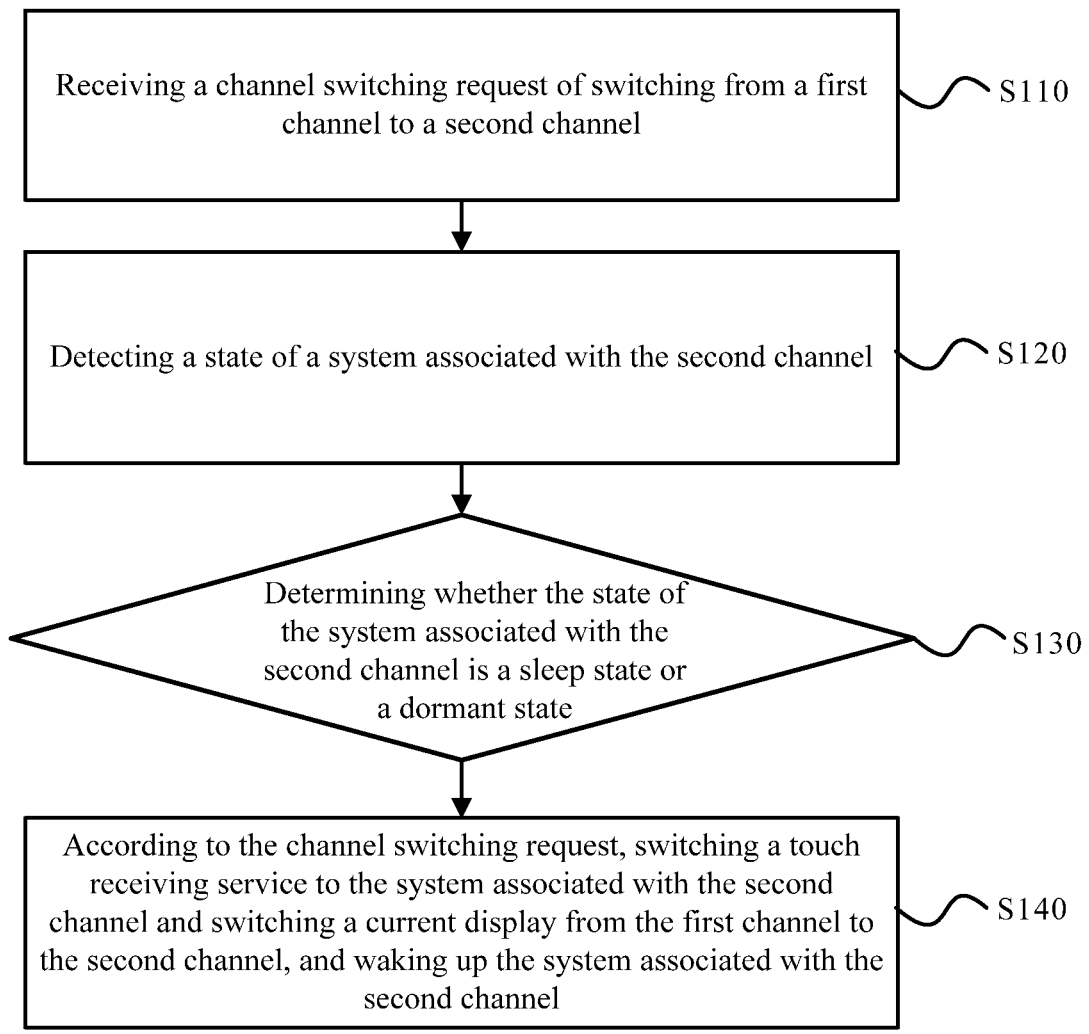
FIG. 1 is a flowchart of a method for channel switching in an interactive smartboard according to an embodiment.

Referring to FIG. 1, a method for channel switching in an interactive smartboard according to an embodiment is provided, which includes the following steps:

S110: receiving a channel switching request to switch from a first channel to a second channel.

The interactive smartboard commonly includes a touch frame, an Android mainboard connected to the touch frame, a PC end, and a micro controller (MCU) connected between the Android mainboard and the PC end. The Android mainboard, the PC end, and the MCU are arranged in a housing of the interactive smartboard. The PC end can run a Windows system or a Linux system, and the Android mainboard can operate based on an Android system, correspondingly. Namely, the interactive smartboard may include multiple types of channels for receiving signals, and different channels may correspondingly transmit different signals, so that the interactive smartboard may display different contents while in different channels. For example, the interactive smartboard may include an Android channel (the TV channel) and a PC channel and etc. The content in a TV signal may be displayed for a user to watch through the Android channel, and a Windows system or Linux system interface may be displayed through the PC channel. When the interactive smartboard is in the TV channel, the user can watch TV through the interactive smartboard, and when in the PC channel, the interactive smartboard may, through the computer function of the built-in PC end, be used as a personal computer.

When the interactive smartboard needs to perform channel switching, first a channel switching button on the touch frame of the interactive smartboard needs to be clicked, thus receiving a channel switching request, and the channel may be switched according to the channel switching request. That is, according to the channel switching request to switch from the first channel to the second channel, the interactive smartboard may be switched from the first channel to the second channel, where the first channel may be the TV channel or the PC channel, and the corresponding second channel may be the PC channel or the TV channel. Namely, when the first channel is the TV channel, the second channel is the PC channel, the interactive smartboard may be switched from the TV channel to the PC channel according to the channel switching request received at that time. When the first channel is the PC channel, the second channel is the TV channel, the interactive smartboard can be switched from the PC channel to the TV channel according to the channel switching request received at that time. In one specific example, the first channel is the TV channel, the second channel is the PC channel, a system associated with the first channel is the Android system, a system associated with the second channel is the Windows system, and the interactive smartboard is currently in the first channel (the Android channel corresponding to the Android system). At this time, the screen of the interactive smartboard displays an interface, which corresponds to the first channel, of the system associated with the first channel, for example, the Android system. If the interactive smartboard needs to be switched to the second channel (the PC channel corresponding to the Windows system), first a button for switching to the second channel on the touch frame of the smart interaction tablet needs to be clicked. As a result, a channel switching request to switch from the first channel to the second channel is generated, thereby receiving the channel switching request to switch from the first channel to the second channel.

S120: detecting a state of a system associated with the second channel.

After receiving the channel switching request to switch from the first channel to the second channel, the interactive smartboard may need to be switched from the first channel to the second channel. However, what is correspondingly displayed through the second channel may be the display interface of the system associated with the second channel. If the system associated with the second channel is still in a sleep or a dormant state, the display interface of the system associated with the second channel cannot be normally displayed, which may result in that even if the channel is switched, the system associated with the second channel corresponding to the switched second channel cannot work properly. Therefore, the state of the system associated with the second channel needs to be detected. If the system is in the sleep or dormant state, the system associated with the second channel needs to be waked up to ensure it to work properly, thus ensuring proper working after the channel switching.

S130: determining whether the state of the system associated with the second channel is a sleep state or a dormant state.

When the state of the system associated with the second channel is the sleep state or the dormant state, perform the following steps:

S140: according to the channel switching request, switching a touch receiving service to the system associated with the second channel and switching a current display from the first channel to the second channel, and waking up the system associated with the second channel.

When the interactive smartboard is in the first channel, the user may perform operations and control on the system associated with the first channel of the interactive smartboard. For example, when the first channel is the TV channel, and the system associated with the first channel is the Android system, the user may watch TV programs using the interactive smartboard, and the user may select programs through the touch control of the interactive smartboard. Namely, when the interactive smartboard is in the first channel and works through the system associated with the first channel, the touch receiving service of the system is associated with the first channel. Namely, touch data generated through an operation on the touch frame of the interactive smartboard is transmitted to the system associated with the first channel, and the system associated with the first channel then responds to the touch. When the first channel needs to be switched to the second channel, the touch receiving service needs to be switched to the system associated with the second channel. Namely, after channel switching, the touch data generated through the operation on the touch frame are transmitted to the system associated with the second channel, and the system associated with the second channel then responds to the touch to realize the touch control to the system associated with the second channel.

In addition, when the interactive smartboard is in the first channel, the display interface of the system associated with the first channel is displayed. The user may watch and operate the display interface of the system associated with the first channel. During the process of switching from the first channel to the second channel, not only the above mentioned touch receiving service needs to be switched, but also the current display of the interactive smartboard needs to be switched from the first channel to the second channel, such that the interactive smartboard after the switching displays the display interface of the system associated with the second channel.

Furthermore, when the touch receiving service and the current display are being switched, if it is detected that the state of the system associated with the second channel is in the sleep state or in the dormant state, the system associated with the second channel also needs to be waked up, such that the system associated with the second channel may work properly after the switching, ensuring the interactive smartboard to work properly. When it is detected that the state of the system associated with the second channel is in the sleep state or in the dormant state, which means that previously when being in the first channel (corresponding to the system associated with the first channel), for energy saving purpose, the system associated with the second channel is controlled to be in the sleep or in the dormant state. At this time, according to the channel switching request, the touch receiving service is switched to the system associated with the second channel and the current display is switched from the first channel to the second channel,—namely, the first channel is switched to the second channel, and the system associated with the second channel is waked up, making the system associated with the second channel work properly. Such that the interactive smartboard may work properly immediately after switching from the first channel to the second channel. The user may perform operations to the system associated with the second channel on the interactive smartboard.

The above mentioned method for channel switching in the interactive smartboard includes, receiving a channel switching request to switch from a first channel to a second channel, detecting a state of a system associated with the second channel; and when the state of the system associated with the second channel is a sleep state or a dormant state, according to the channel switching request, switching a touch receiving service to the system associated with the second channel and switching a current display from the first channel to the second channel, and waking up the system associated with the second channel. Through the above mentioned method for channel switching in the interactive smartboard, after acquiring the channel switch request, the channel switching is performed, that is, the touch receiving service is switched to the system associated with the second channel and the current display is switched from the first channel to the second channel, and the system associated with the second channel in the sleep state or the dormant state is waked up, so that the interactive smartboard can operate normally while the channel is switched to the second channel, without realizing the wake-up of the system associated with the second channel through a user's operation after the channel switching, thereby simplifying the operation process and accelerating the switching process, and at a result, improving the efficiency of the channel switching.

Figure 2:
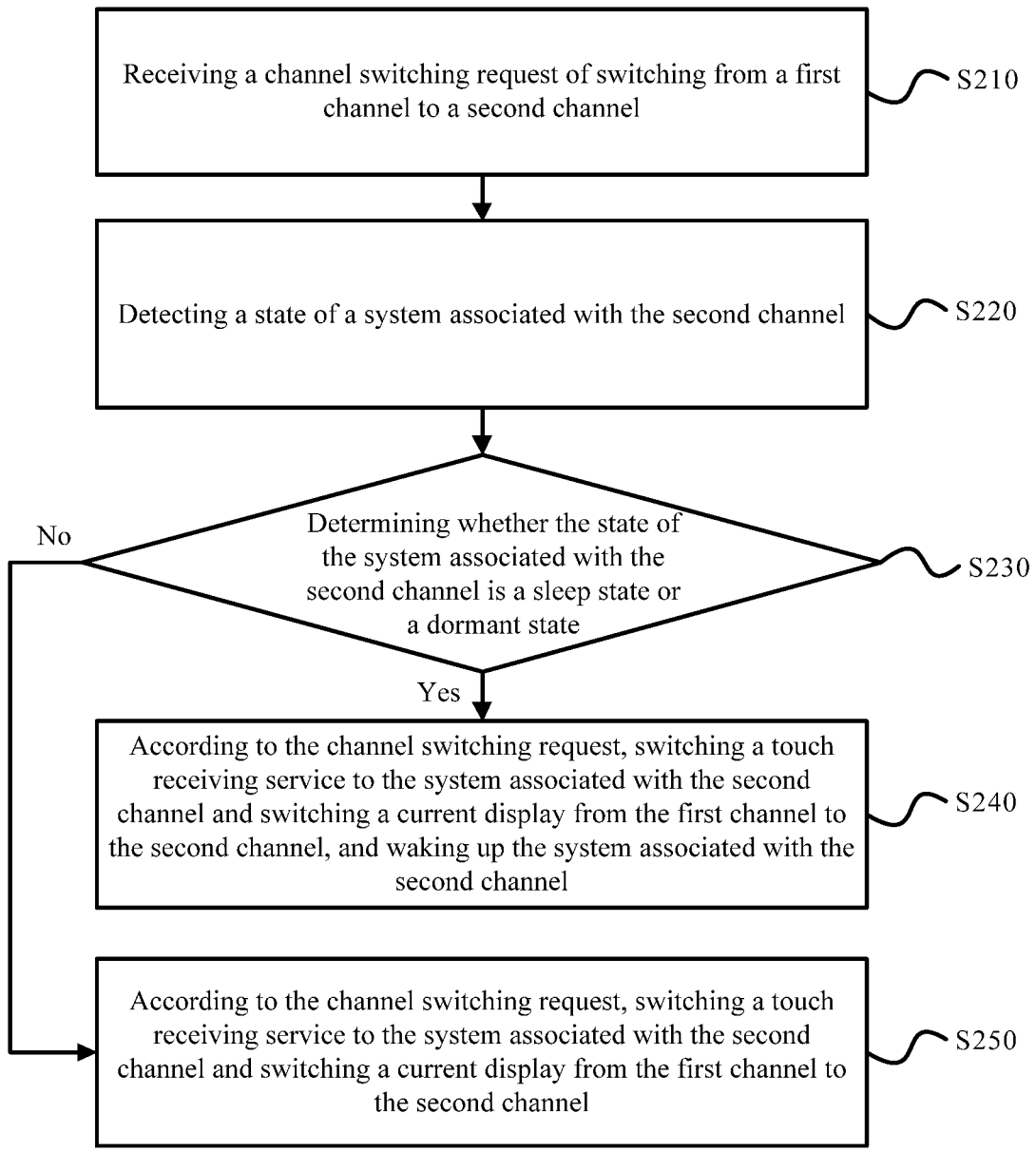
FIG. 2 is a flowchart of a method for channel switching in an interactive smartboard according to another embodiment.

Referring to FIG. 2, in one embodiment, the method for channel switching in the interactive smartboard, when it is detected that the state of the system associated with the second channel is in a work state, further includes the following step:

S250: according to the channel switching request, switching a touch receiving service to the system associated with the second channel and switching a current display from the first channel to the second channel.

After receiving the channel switching request to switch from the first channel to the second channel and detecting the state of the system associated with the second channel, if the state of the system associated with the second channel is the work state,—namely, the system associated with the second channel is not in the sleep or dormant state, which means that the system associated with the second channel may work normally,—namely, the interactive smartboard may operate the system associated with the second channel normally after switching from the first channel to the second channel, and the user may use the interactive smartboard normally. Therefore, according to the channel switching request, the touch receiving service is switched to the system associated with the second channel and the current display is switched from the first channel to the second channel. At the same time, the interactive smartboard may use the system associated with the second channel which is in the work state immediately after switching to the second channel.

In one of the embodiments, where the waking up the system associated with the second channel includes the step of: transmitting a waking up instruction to the system associated with the second channel, to control the system associated with the second channel to switch from the sleep state or the dormant state to the work state.

Specifically, the interactive smartboard includes the first channel system corresponding to the first channel and the second channel system corresponding to the second channel. When the interactive smartboard works in the first channel through the first channel system, to save energy, the second channel system corresponding to the second channel may enter into the sleep or dormant state. When it needs to work in the second channel through the second channel system, first the touch receiving service is switched to the second channel system and the current display is switched from the first channel to the second channel. If the second channel system at that time is in the sleep or dormant state, it needs to be waked up such that the interactive smartboard may work properly through the second channel system after the channel switching. Specifically, through transmitting the waking up instruction to the second channel system, the second channel system is controlled to switch from the sleep state or the dormant state to the work state. Namely, the waking up instruction is transmitted to the second channel system, and the second channel system is switched from the sleep state or the dormant state to the work state upon receiving the waking up instruction.

In one of the embodiments, after the according to the channel switching request, switching the touch receiving service to the second channel system and switching the current display from the first channel to the second channel, and waking up the second channel system, the method further includes the step of: receiving a touch request for a display interface of the second channel system; transmitting the touch request to the second channel system; and acquiring and displaying the view of a result obtained by the second channel system in response to the touch request performing an operation corresponding to the touch request.

After the interactive smartboard is switched from the first channel to the second channel, and the second channel system is in the work state after being waked up, the display interface of the second channel system is displayed on the interactive smartboard. At that time, the touch operation and control may be performed to the second channel system of the interactive smartboard. Namely, the user may perform the touch operation on the display interface of the second channel system, the touch request for the second channel system may be accepted by the interactive smartboard, and transmitted to the second channel system. The second channel system may perform a corresponding operation in response to the touch request to acquire the view of the result. Through acquiring and displaying the view of the result obtained by the second channel system in response to the touch request through performing an operation corresponding to the touch request, the user may watch the displayed view of the result immediately after performing the touch operation.

Figure 3:
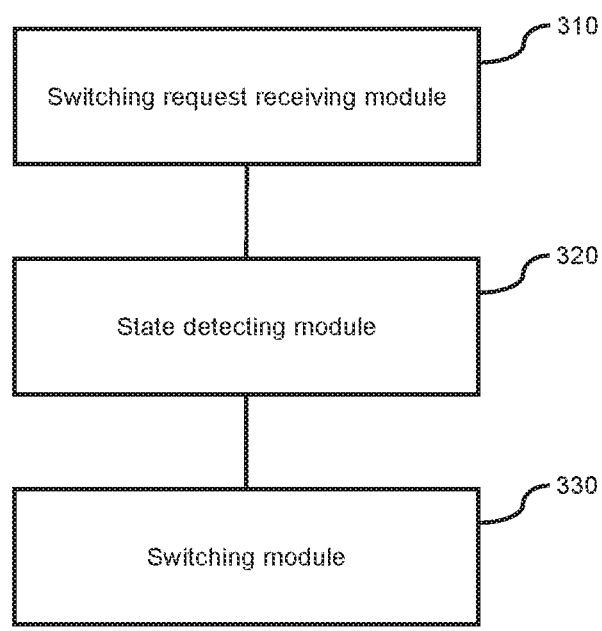
FIG. 3 is a module diagram of an apparatus for channel switching in an interactive smartboard tablet according to an embodiment.

Referring to FIG. 3, an apparatus for channel switching in an interactive smartboard according to an embodiment is further provided, including:

a switching request receiving module 310, configured to receive a channel switching request to switch from a first channel to a second channel.

The interactive smartboard may include multiple types of channels for receiving signals, and different channels may correspondingly transmit different signals, so that the interactive smartboard may display different contents while in different channels. For example, the interactive smartboard may include an Android channel (a TV channel) and a PC Channel and etc. The content in a TV signal may be displayed for a user to watch through the Android channel, and a Windows system or Linux system interface may be displayed through the PC channel. When the interactive smartboard is in the TV channel, the user can watch TV through the interactive smartboard, and when in the PC channel, the interactive smartboard may include the built-in PC end to perform computer functions. As such, the smart interaction tablet may be used as a personal computer.

When the interactive smartboard needs to perform channel switching, first a channel switching button on the touch frame of the smart interaction tablet needs to be clicked for the interactive smartboard to receive a channel switching request, and the channel may be switched according to the channel switching request. Namely, according to the channel switching request to switch from the first channel to the second channel, the interactive smartboard may be switched from the first channel to the second channel, where the first channel may be the TV channel or the PC channel, and the corresponding second channel may be the PC channel or the TV channel. Namely, when the first channel is the TV channel and the second channel is the PC channel, the interactive smartboard may be switched from the TV channel to the PC channel according to the channel switching request received at that time. When the first channel is the PC channel ad the second channel is the TV channel, the interactive smartboard can be switched from the PC channel to the TV channel according to the channel switching request received at that time. In one specific example, the first channel is the TV channel, the second channel is the PC channel, a system associated with the first channel is the Android system, a system associated with the second channel is the Windows system, and the smart interaction tablet is currently in the first channel (the Android channel corresponding to the Android system). At that time, a screen of the interactive smartboard may display an interface, which corresponds to the first channel, of the first channel system such as, for example, the Android system. If it needs to be switched to the second channel (the PC channel corresponding to the Windows system), first a button for switching to the second channel on the touch frame of the interactive smartboard needs to be clicked. As a result of the clicking, a channel switching request for switching from the first channel to the second channel is generated, thereby enabling the receiving of the channel switching request of switching from the first channel to the second channel.

A state detecting module 320, configured to detect a state of a system associated with the second channel.

After receiving the channel switching request of switching from the first channel to the second channel, that is, the smart interaction tablet needs to be switched from the first channel to the second channel. However, what is correspondingly displayed through the second channel is the display interface of the system associated with the second channel. If the system associated with the second channel is still in a sleep or a dormant state, the display interface of the system associated with the second channel cannot be normally displayed, which may result in that even if the channel is switched, the system associated with the second channel corresponding to the switched second channel cannot work properly. Therefore, the state of the system associated with the second channel needs to be detected. If the system is in the sleep or dormant state, the system associated with the second channel needs to be waked up to make it work properly, thus ensuring normal working after the channel switching.

A switching module 330, configured to, when the state of the system associated with the second channel is in a sleep state or in a dormant state, according to the channel switching request, switch a touch receiving service to the second channel system and switch a current display from the first channel to the second channel, and wake up the second channel system.

When the interactive smartboard is in the first channel, the user may perform operations and control on the first channel system of the interactive smartboard. For example, when the first channel is the TV channel, and the first channel system is the Android system, the user may watch TV programs using the interactive smartboard, and the user may perform program selecting using the touch control to the interactive smartboard. Namely, when the smart interaction tablet is in the first channel and works through the first channel system, the touch receiving service is in the first channel system. Namely, touch data generated through an operation on the touch frame of the interactive smartboard are transmitted to the first channel system, and the first channel system then responds to the touch operation. When the first channel needs to be switched to the second channel, the touch receiving service needs to be switched to the second channel system. Namely, after channel switching, the touch data generated through the operation on the touch frame are transmitted to the second channel system, and the second channel system then responds to the touch operation to realize the touch control to the second channel system.

In addition, when the interactive smartboard is in the first channel, the display interface of the first channel system is displayed. The user may watch and operate the display interface of the first channel system. During the process of switching from the first channel to the second channel, not only the above mentioned the touch receiving service needs to be switched, but also the current display of the interactive smartboard needs to be switched from the first channel to the second channel, such that the interactive smartboard after the switching displays the display interface of the second channel system.

Furthermore, when the touch receiving service and the current display are switched, if it is detected that the state of the system associated with the second channel is the sleep state or the dormant state, the second channel system also needs to be waked up, such that the second channel system may work properly after the switching, thus ensuring that the interactive smartboard may work properly. When it is detected that the state of the second channel system is the sleep state or the dormant state, which means previously when being in the first channel (corresponding to the system associated with the first channel), to save energy, the second channel system is control to be in the sleep or the dormant state. At that time, according to the channel switching request, the touch receiving service is switched to the second channel system and the current display is switched from the first channel to the second channel. Namely, the first channel is switched to the second channel, and the second channel system is waked up, enabling the second channel system to work properly. Such that the interactive smartboard may work normally immediately after switching from the first channel to the second channel and the user may perform operation to the second channel system on the interactive smartboard.

In the above mentioned apparatus for channel switching in the interactive smartboard, a channel switching request to switch from a first channel to a second channel is received, a state of a second channel system is detected; and when the state of the second channel system is a sleep state or a dormant state, according to the channel switching request, a touch receiving service is switched to the second channel system and a current display is switched from the first channel to the second channel, and the second channel system is waked up. Through the above mentioned apparatus for channel switching in the interactive smartboard, after acquiring the channel switch request, the channel switching is performed. Namely, the touch receiving service is switched to the second channel system and the current display is switched from the first channel to the second channel, and the second channel system in the sleep state or the dormant state is waked up, so that the interactive smartboard can be used normally while the channel is switched to the second channel, without realizing the wake-up of the second channel system through a user's operation after the channel switching, thereby reducing the operation process and accelerating the switching process, and as a result, improving the efficiency of the channel switching.

In one embodiment, the switching module is further configured to when the state detecting module detects that a state of the second channel system is a work state, according to the channel switching request, switch the touch receiving service to the second channel system and switch the current display from the first channel to the second channel.

After receiving the channel switching request to switch from the first channel to the second channel and detecting the state of the second channel system, if the detected state of the second channel system is the work state, which means that the system associated with the second channel may work normally, namely, the interactive smartboard may operate the second channel system normally after switching from the first channel to the second channel, and the user may use the interactive smartboard normally, thereby, according to the channel switching request, the touch receiving service is switched to the second channel system and the current display is switched from the first channel to the second channel. At that time, the interactive smartboard may use the second channel system which is in the work state immediately after switching to the second channel.

In one of the embodiments, the switching module includes:

a waking up module, configured to transmit a waking up instruction to the second channel system, to control the second channel system to switch from the sleep state or the dormant state to the work state.

Specifically, the interactive smartboard includes the first channel system corresponding to the first channel and the second channel system corresponding to the second channel. When the interactive smartboard works in the first channel through the first channel system, to save energy, the second channel system corresponding to the second channel may enter into the sleep or dormant state. When it needs to work in the second channel through the second channel system, first the touch receiving service is switched to the second channel system and the current display is switched from the first channel to the second channel. If the second channel system currently is in the sleep or dormant state, it needs to be waked up such that the interactive smartboard may work normally through the second channel system after the channel switching. Specifically, through transmitting the waking up instruction to the second channel system, the second channel system is controlled to switch from the sleep state or the dormant state to the work state. Namely, the waking up instruction is transmitted to the second channel system, and the second channel system is switched from the sleep state or the dormant state to the work state upon receiving the waking up instruction.

In one of the embodiments, the apparatus for channel switching in the interactive smartboard further includes: a touch request receiving module, a request transmitting module and a view acquiring module.

The touch request receiving module, configured to receive a touch request for a display interface of the second channel system.

The request transmitting module, configured to transmit the touch request to the second channel system.

The view acquiring module, configured to acquire and display a view of a result obtained by the second channel system performing an operation in response to the received touch request.

After the interactive smartboard is switched from the first channel to the second channel, and the second channel system is in the work state after being waked up, the display interface of the second channel system is displayed on the interactive smartboard. At this time, the touch operations and control may be applied to the second channel system of the interactive smartboard, that is, the user may perform the touch operation on the display interface of the second channel system, the touch request for the second channel system may be accepted by the interactive smartboard, and transmitted to the second channel system. The second channel system may perform a corresponding operation in response to the touch request to acquire the view of the result. Through acquiring and displaying the view of the result obtained by the second channel system performing an operation corresponding to the touch request in response to the touch request, the user may watch the displayed view of the result immediately after performing the touch operation.

The technical features of the above embodiments may be combined arbitrarily. For the sake of brevity of the description, not all the possible combinations of the technical features in the above embodiments are described. However, as long as there is no contradiction in the combination of these technical features, it is thought to be within the scope described in this specification.

The above embodiments merely represent several embodiments of the present invention, which are described more specific and in details, but it should not be understood that the scope of the present invention patent is limited therein. It should be noted that, for those skilled in the art, several variations and improvements may be made without departing from the concept of the present invention, and these are all within the protection scope of the present invention. Therefore, the protection scope of the present invention patent shall be subject to the appended claims.

What is claimed is:

1. A method for channel switching in an interactive smartboard, wherein the smartboard comprises at least two channels for receiving signals, a first channel of the at least two channels receiving a first signal generated by a first system, a second channel of the at least two channels receiving a second signal generated by a second system that is coupled to the first system through a microcontroller, and the smartboard displays different contents while in different channels, the method comprising:
   receiving a channel switching request to switch from the first channel associated with the first system to the second channel associated with the second system;
   detecting whether a state of the second system associated with the second channel is a sleep state or a work state; and
   responsive to detecting that the state of the second system is the sleep state, according to the channel switching request,
      switching a touch receiving service to the second system and switching a current display from the first channel to the second channel, and
      while the touch receiving service to the second system and the current display from the first channel to the second channel are being switched, waking up the second system to ensure the second channel working properly after switching the current display from the first channel to the second channel; and
   responsive to detecting that the state of the second system is the work state, according to the channel switching request, without a process to wake up from the sleep state, switching the touch receiving service to the second system and switching the current display from the first channel to the second channel.

2. The method for channel switching in the interactive smartboard according to claim 1, wherein the waking up the second system further comprises:
   transmitting a waking up instruction to the second system, to control the second system to switch from one of the sleep state to the work state.

3. The method for channel switching in the interactive smartboard according to claim 1, wherein, after the according to the channel switching request, switching the touch receiving service to the second system and switching the current display from the first channel to the second channel, and waking up the second system, further comprises:
   receiving a touch request to a display interface of the second system;
   transmitting the touch request to the second system; and
   acquiring and displaying a view of a result obtained by the second system performing an operation corresponding to the touch request in response to the touch request.

4. The method for channel switching in the interactive smartboard according to claim 1, wherein the first channel is a TV channel, the second channel is a personal computer (PC) channel, the first system associated with the first channel is an Android system, and the second system is a Windows system.

5. An apparatus for channel switching in an interactive smartboard, wherein the smartboard comprises at least two channels for receiving signals, a first channel of the at least two channels receiving a first signal generated by a first system, a second channel of the at least two channels receiving a second signal generated by a second system that is coupled to the first system through a microcontroller, and the smartboard displays different contents while in different channels, comprising:
   a switching request receiving module to receive a channel switching request to switch from the first channel associated with the first system to the second channel associated with the second system;
   a state detecting module to detect whether a state of the second system associated with the second channel is a sleep state or a work state; and
   a switching module to responsive to detecting that the state of the second system is the sleep state, according to the channel switching request,
      switch a touch receiving service to the second system and switch a current display from the first channel to the second channel, and
      while the touch receiving service to the second system and the current display from the first channel to the second channel are being switched, wake up the second system to ensure the second channel working properly after switching the current display from the first channel to the second channel; and
   responsive to detecting that the state of the second system is the work state, according to the channel switching request, without a process to wake up from the sleep state, switch the touch receiving service to the second system and switching the current display from the first channel to the second channel.

6. The apparatus for channel switching in the interactive smartboard according to claim 5, wherein the switching module comprises:
   a waking up module to transmit a waking up instruction to the second system, and control the second system to switch from one of the sleep state to the work state.

7. The apparatus for channel switching in the interactive smartboard according to claim 5, further comprising:
   a touch request receiving module to receive a touch request to a display interface of the second system;
   a request transmitting module to transmit the touch request to the second system; and
   a view acquiring module to acquire and display a view of a result obtained by the second system performing an operation corresponding to the touch request in response to the touch request.

8. The apparatus for channel switching in the interactive smartboard according to claim 5, wherein the first channel is a TV channel, the second channel is a PC channel, the first system associated with the first channel is an Android system, and the second system is a Windows system.

9. A computing device for channel switching in an interactive smartboard, wherein the smartboard comprises at least two channels for receiving signals, a first channel of the at least two channels receiving a first signal generated by a first system, a second channel of the at least two channels receiving a second signal generated by a second system that is coupled to the first system through a microcontroller, and the smartboard displays different contents while in different channels, the computing device comprising: a computer readable storage medium, a display screen with a touch function, and one or more processors, wherein the computer readable storage medium is configured to store at least one instruction, and the at least one instruction, when executed by the one or more processors, causes the computing device to:
   receive a channel switching request to switch from the first channel associated with the first system to the second channel associated with the second system;
   detect whether a state of the second system associated with the second channel is a sleep state or a work state; and responsive to detecting that the state of the second system is the sleep state, according to the channel switching request,
    switch a touch receiving service to the second system and switch a current display from the first channel to the second channel, and
    while the touch receiving service to the second system and the current display from the first channel to the second channel are being switched, wake up the second system to ensure the second channel working properly after switching the current display from the first channel to the second channel; and
responsive to detecting that the state of the second system is the work state, according to the channel switching request, without a process to wake up from the sleep state, switch the touch receiving service to the second system and switching the current display from the first channel to the second channel.

10. The computing device of claim 9, wherein responsive to detecting that the state of the second system is the sleep state, according to the channel switching request, switch a touch receiving service to the second system and switch a current display from the first channel to the second channel, the at least one instruction further causes the computing device to:
    transmit a waking up instruction to the second system, and control the second system to switch from one of the sleep state to the work state.

11. The computing device of claim 9, wherein the at least one instruction, when executed, causes the computing device to:
    receive a touch request to a display interface of the second system;
    transmit the touch request to the second system; and
    acquire and display a view of a result obtained by the second system performing an operation corresponding to the touch request in response to the touch request.

12. The computing device of claim 9, wherein the first channel is a TV channel, the second channel is a PC channel, the first system associated with the first channel is an Android system, and the second system is a Windows system.

\* \* \* \* \*